Figure 1:
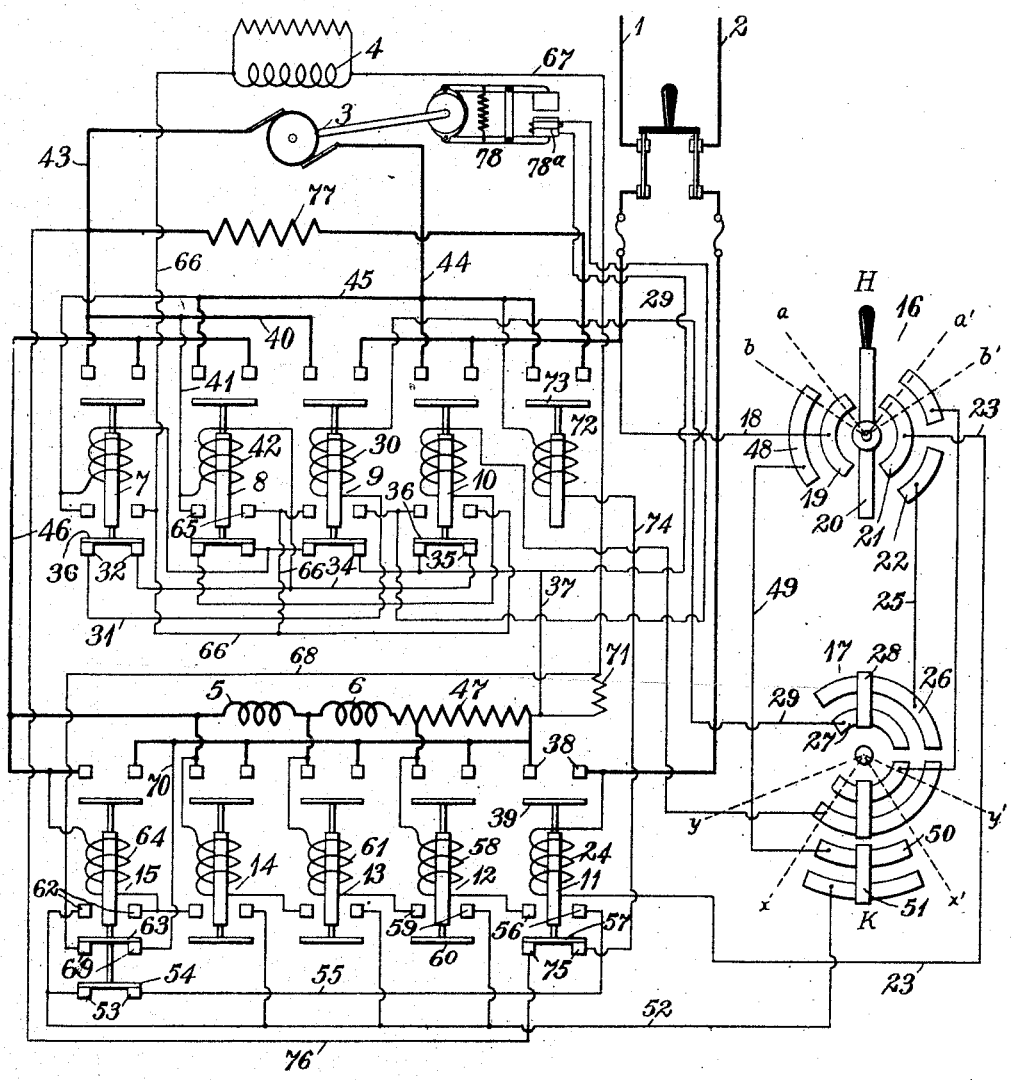

H. D. JAMES.
ELECTRIC MOTOR CONTROL.
APPLICATION FILED MAR. 4, 1907.

974,152.

Patented Nov. 1, 1910.
2 SHEETS—SHEET 1.

WITNESSES:
Fred H Miller
R J Dearborn

INVENTOR
Henry D. James
BY
Wesley G. Carr
ATTORNEY

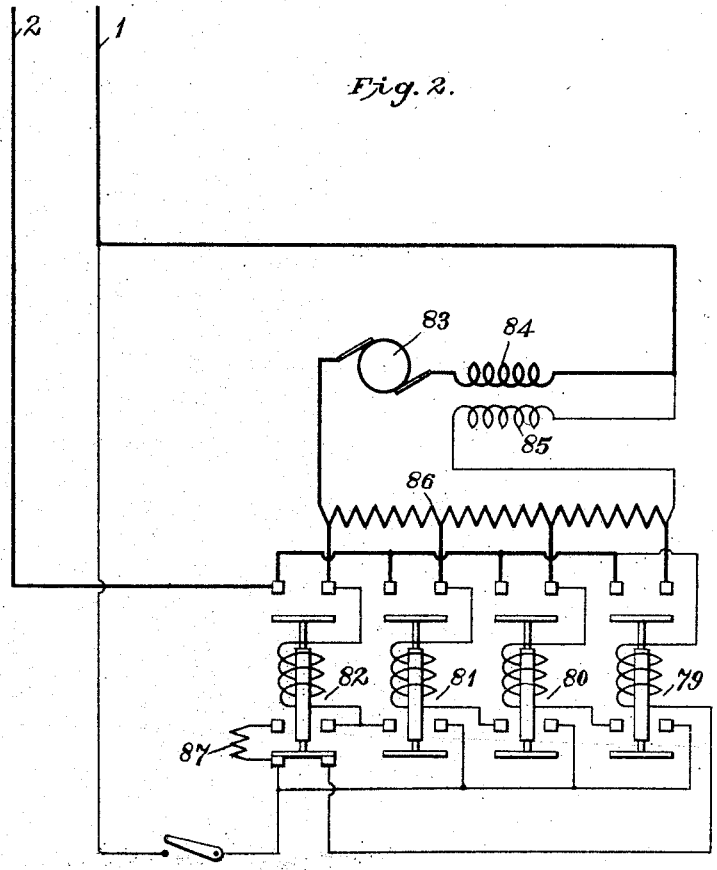

UNITED STATES PATENT OFFICE.

HENRY D. JAMES, OF PITTSBURG, PENNSYLVANIA, ASSIGNOR TO WESTINGHOUSE ELECTRIC & MANUFACTURING COMPANY, A CORPORATION OF PENNSYLVANIA.

ELECTRIC-MOTOR CONTROL.

974,152.  Specification of Letters Patent.  Patented Nov. 1, 1910.

Application filed March 4, 1907. Serial No. 360,512.

*To all whom it may concern:*

Be it known that I, HENRY D. JAMES, a citizen of the United States, and a resident of Pittsburg, in the county of Allegheny and State of Pennsylvania, have invented a new and useful Improvement in Electric-Motor Control, of which the following is a specification.

My invention relates to control systems for electric motors, and has special reference to systems of this character which severally comprise a plurality of independently operated accelerating and control switches.

The object of my invention is to provide, in a system of the aforesaid class, means for maintaining the majority of the accelerating switches in open position, except for a short starting period, so that the starting resistance may be re-inserted when it is desired to bring the motor to rest.

Shunt or compound wound electric motors are often employed for variable speed service in connection with elevators and machine tools and, in order to avoid flashing over and other abnormal and detrimental conditions when a motor of this character is retarded from high speed operation under weak field conditions, I automatically re-insert the resistance which was cut out as the motor accelerated.

Figure 1 of the accompanying drawings is a diagrammatic view of a system of electric motor control arranged in accordance with my invention. Fig. 2 is a view, similar to Fig. 1, of a simplified system having a slightly modified arrangement of accelerating switches.

Referring to Fig. 1 of the drawings, electrical energy may be supplied from any convenient source, through supply conductors 1 and 2, to an electric motor 3 having a shunt field magnet winding 4 and series field magnet windings 5 and 6. The circuit connections for the motor are governed by electrically operated reversing switches 7, 8, 9 and 10, a line switch 11, accelerating switches 12, 13 and 14 and a control switch 15 all of which are governed by a master switch 16 and a limit switch 17. The switch 16 is adapted to occupy either of two forward positions *a* and *b* and either of two reverse positions $a'$ and $b'$ and the switch 17 may occupy either of positions $x$ and $y$ in which a rotation of motion in one direction is permitted, and either of positions $x'$ and $y'$ in which a rotation of the motor is permitted only in the reverse direction.

During the normal operation of the motor the limit switch 17 occupies a mid-position K and, under these conditions, the motor may be stopped by moving the master switch 16 to its mid-position H. Assuming that the limit switch 17 occupies the position K and that the master switch 16 is moved to position *a* from position H, the circuit connections are as follows: Energy is supplied from line conductor 1 through a control conductor 18, stationary contact member 19 of the master switch 16 and movable contact arm 20, to the stationary contact members 21 and 22. One branch of the circuit is continued through contact member 21, conductor 23 and actuating magnet winding 24 of line switch 11 to the opposite line conductor 2. The other branch of the circuit is fro-line conductor 1 to stationary contact me n-ber 22 of switch 16, through conductor 25, stationary contact members 26 and 27 of the switch 17 (which are bridged by a movable contact member 28), conductor 29, magnet winding 30 of reversing switch 9, conductor 31, stationary contact fingers 32 of the reversing switch 7 (which are bridged by contact member 33), conductor 34, contact fingers 35 (which are bridged by a movable contact member 36 of the reversing switch 10), conductor 37, contact fingers 38 (which are bridged by movable contact member 39 of the line switch 11 that is closed by reason of the energizing of its magnet winding 24) to the opposite line conductor 2. The switches 11 and 9 are closed in the order named as soon as the circuits above traced are complete and energy is supplied from line conductor 1 through the reversing switch 9, conductor 40 and conductor 41, to the magnet winding 42 of the reversing switch 8, from which point circuit is completed as already described through conductor 34. The energizing of the magnet winding 42 effects the closure of the switch 8 so that a main circuit is completed from line conductor 1 through switch 9, conductors 40 and 43, the armature of motor 3, conductors 44 and 45, switch 8, conductor 46, series field magnet windings 5 and 6, a resistance 47 and the switch 11 to the opposite line conductor 2. The motor is thus started under strong field conditions and with a suitable resistance inserted in its armature circuit.

If the master switch is moved from the position $a$ to the position $b$, the motor will be accelerated automatically, a circuit being completed from the conductor 18, through stationary contact members 19 and 48 of the master switch, conductor 49, stationary contact members 50 (which are bridged by movable contact member 51 of switch 17), conductor 52, contact fingers 53 (which are bridged by contact member 54 when the control switch 15 is open), conductor 55, contact fingers 56 (which are bridged by contact member 57 when the line switch 11 is closed), magnet winding 58 of accelerating switch 12 and resistance 47 to the opposite line conductor 2. As soon as the switch 12 is closed, the aforesaid circuit is completed from conductor 52 through contact fingers 59 (which are bridged by contact members 60), magnet winding 61 of the accelerating switch 13, series field magnet 6 and switches 12 and 11 to the opposite line conductor. In a similar manner, the switches 13, 14 and 15 are closed successively. As the accelerating switches 12, 13 and 14 are closed, resistance 47 and series field magnet windings 6 and 5 are successively short-circuited. The closure of the control switch 15 connects the conductor 46 to the line conductor 2, through switches 11 and 15 and interrupts the circuit which was completed through contact fingers 53 and bridging contact member 54. This interruption deënergizes the magnet winding 58 and permits the switch 12 to open after which the switches 13 and 14 successively open, since the circuit through each magnet winding is dependent upon the closure of the adjacent switch.

It will be readily understood that a considerable time will elapse between the closure of the control switch 15 and the opening of the switch 14, so that ample time is allowed for the establishment of a circuit from conductor 52 through contact fingers 62 (which are bridged by contact member 63 when the switch 15 is closed), actuating magnet winding 64 and switches 15 and 11 to the line conductor 2.

The shunt field 4 is connected in a circuit (established when the switch 8 is closed), from conductor 41, through contact fingers 65, conductor 66 in the field magnet, conductor 67, conductor 68, contact fingers 69 (which are bridged by the contact member 63 when the control switch 15 is open), conductor 70 and line switch 11 to line conductor 2, and after the motor is accelerated as far as possible, by reason of the armature resistance 47, the series field magnet windings 5 and 6 being short-circuited, its speed is still more increased when switch 15 is closed by reason of the fact that the circuit through contact fingers 69 is interrupted and a resistance 71, which was formerly short-circuited, is now connected in series with the field magnet winding.

Since, in the acceleration of the motor, the control switch 15 was closed last, when the master switch is moved from the position $b$ to the position $a$ and the motor is retarded, this switch will open first, but if the field of the motor is suddenly strengthened when the motor is operating at a high speed, the counter electromotive force of the armature may considerably exceed the impressed electromotive force of the line. A voltage disturbance on the line will result in this event and, furthermore, the motor is liable to flash over or destructive electric arcs may at least be formed at the commutator brushes. This difficulty is avoided in the arrangement illustrated, since the accelerating switches 12, 13 and 14 are opened, as hereinbefore explained, as soon as the control switch 15 is closed, consequently, when the switch 15 is open and the field is strengthened, the accelerating resistance 47 is included in the armature circuit and electromotive force disturbances in the supply circuit are substantially avoided. If the master switch is now moved from the position $a$ to its "off" position the line switch 11 will be opened, the circuit through its magnet winding being interrupted, and a magnet winding 72 of a switch 73 will be connected across the armature of the motor through conductor 74, contact fingers 75 (which are bridged by a contact member 57 of the switch 11), and conductor 76. The switch 73 is held closed until the counter electromotive force of the motor becomes negligible and, therefore, the current generated in the motor armature is absorbed in a resistance 77 during this final period of retardation. If the master switch is moved successively into positions $a'$ and $b'$ the motor will be accelerated in a similar manner except that switches 7 and 10, instead of switches 8 and 9, will be closed and the direction in which the current flows through the armature of the motor will be reversed. Substantially the same conditions are brought about when the limit switch 17 is moved successively to positions $x$ and $y$ or to positions $x'$ and $y'$ as are obtained when the master switch is moved from its position $b$ or $b'$ to position H through positions $a$ or $a'$ except that the limit switch is so arranged as to be automatically actuated by the car or other device operated by the motor at the ends of its travel and to prohibit a further movement of the motor in the same direction.

In addition to the re-generative braking effect obtained when the resistance 77 is included in the armature circuit of the motor, a mechanically applied brake 78 of well known form may be employed, a release magnet winding 78ª being provided, as indicated in Fig. 1. This magnet winding will be energized as soon as either of the reversing switches 9 or 10 is closed and, consequently, the brake which it may control will be released just before the motor is started.

Referring to Fig. 2, switches 79, 80, 81 and 82 correspond to switches 11, 12, 14 and 15 in Fig. 1 and are adapted to effect the acceleration of a compound wound motor 83 (having a series field magnet winding 84 and a shunt field magnet winding 85), by gradually short-circuiting a resistance 86 and finally bridging the intermediate switches 80 and 81 as the switches 12, 13 and 14 are bridged in the system shown in Fig. 1. When the switch 82 is closed, energy is supplied to its magnet winding through an auxiliary resistance 87 and, consequently, the current required for the control circuits during the full speed operation of the motor is less than that required for the circuits during its acceleration.

I claim as my invention:

1. In a control system for electric motors, the combination with a series of independently operated switches, actuating magnet windings for each switch, and means for so energizing the windings as to close the switches in a predetermined order, of means for causing the switches to automatically open in the order in which they were closed.

2. In a system of electric motor control, the combination with a series of electrically governed switches that are adapted to close in a predetermined sequence, and independent means for operating each switch, of means for automatically opening the switches in the same sequence.

3. In a system of electric motor control, the combination with a plurality of electrically governed accelerating switches, a control switch that bridges the accelerating switches, and means for closing the switches in a predetermined order, of means, dependent upon the closure of the control switch, for automatically opening the remaining switches in the order in which they were closed.

4. In a control system, the combination with a motor having armature and field magnet windings, automatic accelerating switches therefor, a control switch adapted to bridge the accelerating switches, means for closing the accelerating switches in a predetermined order, and means, dependent upon the closure of the accelerating switches, for closing the control switch, of means, dependent upon the closure of the control switch, for automatically opening the accelerating switches in the order in which they were closed.

5. In a system of control, the combination with an electric motor, an accelerating resistance therefor, a field magnet, a resistance therefor, a series of independently operated switches for cutting out the accelerating resistance, a control switch for bridging the accelerating switches and for inserting the field resistance, of means, dependent upon the closure of the control switch, for automatically opening the accelerating switches in a predetermined order.

6. In a system of control, the combination with an electric motor, an accelerating resistance therefor, a field magnet, a resistance therefor, a series of independently operated switches that are adapted to close in a predetermined sequence and to cut out the accelerating resistance, a control switch for bridging the accelerating switches and for inserting the field resistance, of means, dependent upon the closure of the control switch, for automatically opening the accelerating switches in the order in which they are closed.

7. In a system of electric motor control, the combination with an armature resistance, a field resistance and independently operating switches for automatically supplying energy to the motor through said armature resistance, gradually short-circuiting said armature resistance and finally weakening the motor field by inserting said field resistance, of means for automatically bringing the motor to rest by simultaneously eliminating the field resistance and re-inserting the armature resistance before the supply of energy is interrupted.

8. In a control system, the combination with a supply circuit, an electric motor having an armature, a shunt field magnet winding and series field magnet windings, a shunt field resistance and an armature resistance, of a plurality of independently operated switches for successively and automatically short-circuiting the field resistance, connecting the motor to a supply circuit with the series field magnet winding and the armature resistance connected in series with the motor armature, gradually reducing the armature resistance, short-circuiting the series field magnet windings and reinserting the shunt field resistance, and means for automatically stopping the motor by simultaneously short-circuiting the field resistance, reinserting the series field magnet windings and the armature resistance and finally interrupting the supply circuit.

9. In a system of electric motor control, the combination with a plurality of governing switches, of means for automatically closing the switches in a predetermined sequence, and means, dependent upon the closure of the last switch, for opening the other switches in a predetermined order.

10. In a system of electric motor control, the combination with a plurality of accelerating switches, and a control switch, of means, dependent upon the closure of the control switch, for automatically opening the other switches in the order in which they were closed.

In testimony whereof, I have hereunto subscribed my name this 28th day of February, 1907.

HENRY D. JAMES.

Witnesses:
WILLIAM A. PARIS,
BIRNEY HINES.